United States Patent Office 2,951,875
Patented Sept. 6, 1960

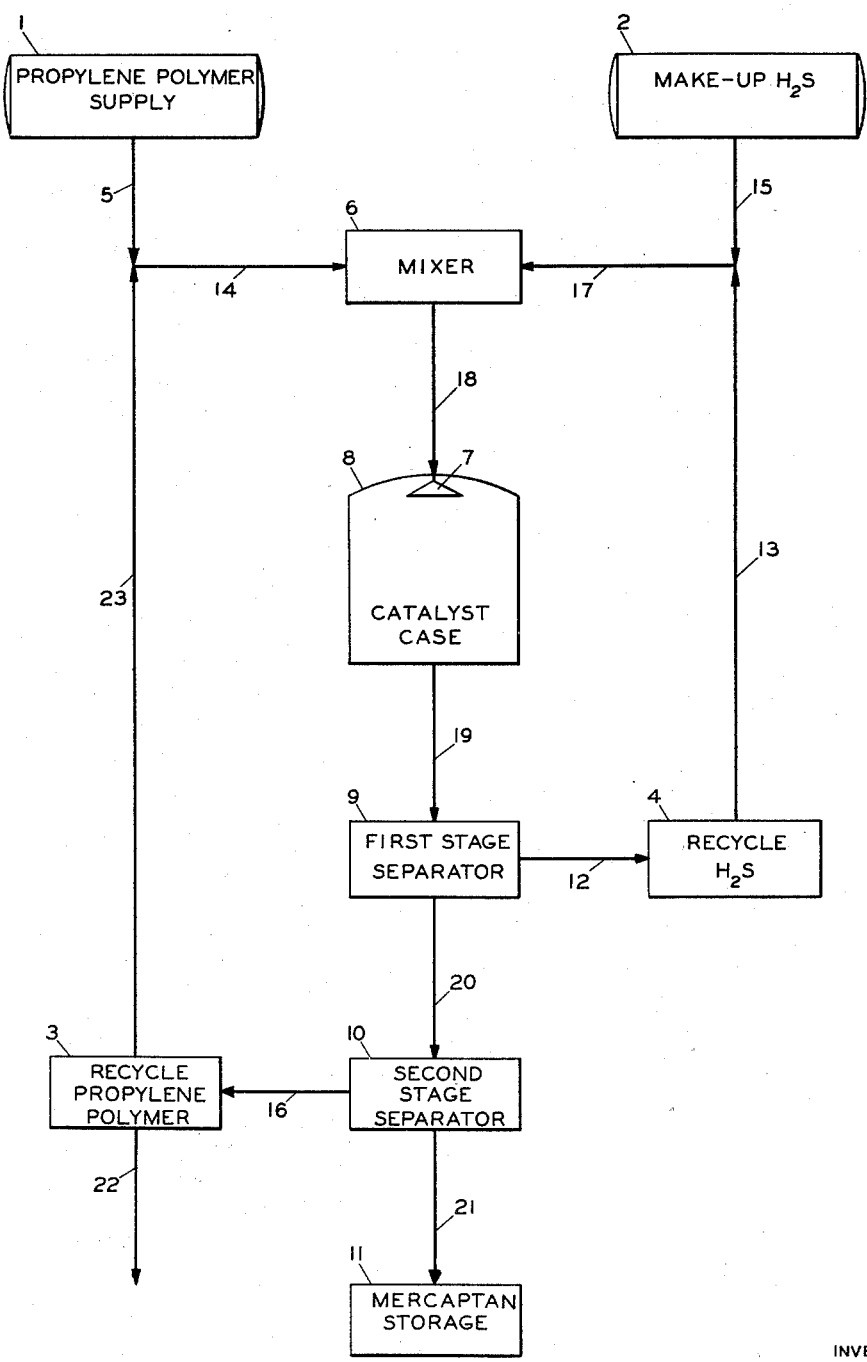

2,951,875

PRODUCTION OF HIGH MOLECULAR WEIGHT
MERCAPTANS

Bernard Loev, Philadelphia, and Roland H. Goshorn, Fort Washington, Pa., assignors to Pennsalt Chemicals Corporation, Philadelphia, Pa., a corporation of Pennsylvania Filed Apr. 10, 1958, Ser. No. 727,665

5 Claims. (Cl. 260—609)

This invention relates to a method for the preparation of high molecular weight mercaptans characterized by the production of high conversions under relatively mild operating conditions, and more particularly provides a method for the preparation of aliphatic mercaptans containing from 8 to 18 carbon atoms by reaction of a propylene homopolymer with hydrogen sulfide in the presence of a promoted silica catalyst.

High molecular weight aliphatic mercaptans have an extensive industrial market, especially in the rubber manufacturing industry, where they are of particular value as modifiers in the manufacture of synthetic rubber. Ordinarily, these mercaptans are prepared most cheaply and conveniently by the reaction of hydrogen sulfide with olefin polymers, which are generally polymers of butylene.

When a promoted silica catalyst is used to catalyze the reaction of hydrogen sulfide with the olefin polymer, to produce commercially practicable conversions, the process has hitherto been carried out under operating conditions which are quite strenuous and severe, employing pressures of about 1000 p.s.i.g., and temperatures above about 100° C. Under these operating conditions, it has been found that a considerable degree of depolymerization of the olefin polymer occurs. This results in substantial losses of the polymer, so that it is impossible to obtain quantitative yields. The depolymerization also complicates the recovery of the product, requiring the introduction of additional steps and apparatus to separate resulting low molecular weight olefin and low molecular weight mercaptan from the desired high molecular weight mercaptan. The seriousness of the difficulties caused by depolymerization in this art is illustrated by the numerous proposals in the patent literature for means to obviate this disadvantageous feature, by pretreatment of the polymer to remove more unstable components and the like.

Another particular disadvantage of the prior art processes for high molecular weight aliphatic mercaptan manufacture is that they are carried out under extremely high pressures. The operating pressures required to obtain even moderate conversions are of the order of 500 to 1500 pounds per square inch (p.s.i.g.). Ordinary factory equipment prepared for use in the chemical and petroleum industries is rated to withstand only up to about 350 p.s.i.g. as a maximum. About 400 p.s.i.g. is considered to be the breakpoint requiring use of the next, more costly grade of equipment, specially designed to have the necessary resistance to internal pressure. Thus, the need for resorting to high pressures in chemical reactions such as mercaptan synthesis imposes burdensome and expensive requirements in plant design.

It is an object of this invention to provide an improved method for the preparation of high molecular weight aliphatic mercaptans.

A particular object is to provide a method for the preparation of high molecular weight mercaptans under relatively mild operating conditions.

Another object is to provide a low pressure method for the preparation of mercaptans of high molecular weight.

Another object is to provide a low temperature method for the preparation of mercaptans of high molecular weight.

Another object is to provide a method for the preparation of mercaptans from propylene homopolymers.

A further object is to provide a method whereby the depolymerization of olefin polymers in the preparation of high molecular weight mercaptans is obviated.

These and other objects will be apparent from a consideration of the following specification and the claims.

It has now been found that aliphatic high molecular weight mercaptans containing from 8 to 18 carbon atoms are advantageously prepared, in high conversions and substantially quantitative yields, by the reaction of hydrogen sulfide with a propylene homopolymer of the aforesaid carbon atom range in the presence of a promoted silica catalyst at a superatmospheric pressure below about 350 p.s.i.g. and at temperatures ranging down to as low as about 15° C.

Decided advantages accrue to the process of the present invention for the manufacture of high molecular weight mercaptans. Depolymerization is substantially absent. This is significant as resulting in quantitative yields of the desired mercaptan, and full utilization of the olefin polymer. Losses of the polymer being obviated, the process is greatly simplified as compared to prior art processes in that it is unnecessary either to go through a preliminary stabilization step in which a portion of the polymer is thermally decomposed, or to make provision for removal of low molecular weight byproducts such as low molecular weight olefins and low molecular weight mercaptans in separating the desired high molecular weight mercaptan product. Furthermore, the present process is especially advantageous in that high pressure apparatus is not required. At pressures well within the operating range of ordinary factory equipment, it produces substantially complete one-pass conversion. This is to be contrasted with prior art processes wherein, even when the pressures are as high as 1000 p.s.i.g., the conversion per pass is ordinarily only about 30–40%. When the process of this invention is adopted, the fact that only quite low pressures need be attained to produce high conversions significantly reduces equipment costs and simplifies plant design. Additionally, as set forth in greater detail hereinafter, the present process may be operated at relatively low temperatures, which minimizes equipment requirements as well as operating costs.

The propylene homopolymers used in carrying out the present process are known in the art. They are prepared by passing propylene to a polymerization system under conversion conditions of temperature and pressure. In general, the conditions employed in polymerizing propylene comprise pressures on the order of 1000–2000 p.s.i.g. and temperatures of from 100° to 300° C., depending on the nature of the polymerization catalyst employed. The catalyst may be sulfuric acid, an alumina-silica catalyst or like materials known as catalysts for the conversion of olefins to liquid polymers. The polymerized effluent is passed through a fractionating system in which selected cuts are recovered, while other olefinic constituents of the effluent are removed and either recycled to the polymerizer or segregated and utilized for other purposes. The polymers in most general use are identified as $C_9$ (propylene trimer, tripolylene) and $C_{12}$ (propylene tetramer, tetrapropylene) polymers; $C_{15}$ and $C_{18}$ polymers are also available though less commonly used. It is well recognized that the usual propylene polymers consist of mixtures of isomers and may have a small content of olefins not containing a number of carbon atoms which is a multiple of $C_3$. Thus, for example, a tetrapropylene polymer may contain olefins covering the range from $C_{11}$ to $C_{15}$, with about a 75% content of $C_{12}$ olefins. The tetrapropylene products industrially available may boil through the range of from 160° to 200° C. A tripropylene polymer also contains a distribution of olefin polymers, above and below the average $C_9$ carbon atoms content, and typically boils through the range of from 120° to 155° C. These polymers are composed preponderantly of non-terminally olefinic, branched-chain hydrocarbons; the products of addition of hydrogen sulfide to the polymers will be branched-chain mercaptans, of configuration as determined by the Markownikoff rule for addition to double bonds.

Referring now to operation of the process of the invention, the accompanying drawing represents in schematic form one arrangement of apparatus suitable for carrying out the process into effect. It will be appreciated that the representation is diagrammatic, and that numerous auxiliary pieces of equipment such as valves, pumps, compressors, heat exchangers, coolers, control instruments, injectors or other methods of producing vacuums and the like, which can readily be supplied by one skilled in the art, are not shown in order to avoid confusion in the drawing.

The propylene polymer is passed from makeup polymer storage represented by rectangle 1 through lines 5 and 14 to mixer 6. Additional propylene polymer may be recycled via line 23 through line 14 to mixer 6 from second stage separator 10. Hydrogen sulfide in at least an equimolar amount, and preferably a considerable molar excess with respect to the propylene polymer, is passed to line 17 through line 15 from make-up $H_2S$ storage 3 and through line 13 from recycle $H_2S$ surge tank 4. Substantial quantities of hydrogen sulfide may be recycled from the first stage separator 9 to line 17. The total hydrogen sulfide feed is passed through line 17 to mixer 6 where it is mixed with the propylene polymer. From the mixer 6, the mixture of hydrogen sulfide and propylene homopolymer passes through line 18 to enter the catalyst case 8 through distributor 7. Catalyst case 8 contains promoted silica catalyst.

The effluent from the catalyst case is passed through line 19 to the first stage separator 9 where the pressure is lowered sufficiently to flash off substantially all the hydrogen sulfide present in the effluent. The hydrogen sulfide flashed off is taken off through line 12 for recycle via surge tank 4 and line 13 to the mixer 6. After removal of the hydrogen sulfide through line 12, the liquid phase from the first stage separator 9, if the mercaptan concentration is sufficiently high, may be passed directly to product storage 11. Alternatively, as indicated in the drawing, it will be passed through line 20 to the second stage separator 10. The second stage separator 10 operates at a lower pressure than first stage separator 9. Ordinarily, second stage separator 10 is maintained at subatmospheric pressures; and may comprise a vacuum distillation means operated, for example, at 30 mm. Hg or less absolute pressure. The temperature of operation of second stage separator 10 will vary with the molecular weight of the olefin polymer charge, but will ordinarily be in the range of from room temperature up to about 200° C. In the second stage separator 10, the effluent from the first stage separator 9 is topped, and the toppings, which consist essentially of unreacted propylene polymer, are removed through line 16. The second stage separation will ordinarily be conducted commercially to produce a residue comprising 95% or more aliphatic high molecular weight mercaptan, which is a quality of product of saleable concentration. The high molecular weight aliphatic mercaptan product may be removed through line 21 and sent directly to product storage 11, or, if desired, subjected to a further distillation. Usually it will be wholly unnecessary for mercaptan produced in accordance with this process to be other than merely withdrawn for use.

The amount of propylene polymer topped of in second stage separator 10 and removed through line 16 may vary within wide limits. The process of the invention is outstanding in applicability to the production of maximum one-pass conversion to mercaptans, and may well be so operated. In this case, the crude product issuing from first stage separator 9 may comprise as high as 85% or more by weight of the desired heavy mercaptan, corresponding in chain length to the olefin polymer converted. The yield of the desired mercaptan is quantitative, the remainder of the crude comprising unreacted propylene polymer, which may if desired be topped off in second stage separator 10 to increase the mercaptan concentration of the product. On the other hand, substantially quantitative yields may alternatively by produced if desired by operating this process on a multi-pass basis, producing, for example, 50%, 60% or 75% conversion per pass, and recycling the unreacted olefin polymer to the process. As shown in the drawing, it may be advisable to provide means such as line 22 whereby a bleed stream may be taken off from the main stream of unreacted olefin polymer removed in second stage separator 10 for recycle, so that the build-up of unreactive and non-olefinic components in the original propylene polymer charge may be minimized. Other than this optional bleed line 22, it is totally unnecessary in the present process to provide any elaborate mechanism for removal of byproducts such as light or intermediate olefins or mercaptans, since these undesired materials are substantially entirely absent from the products of the present process. This freedom from undesired and interfering byproducts is one of the particular advantageous features of this process.

Referring now in more detail to the conditions under which the present process is operated, the molar ratio of hydrogen sulfide to propylene polymer utilized in the practice of this invention is preferably at least 1:1, the stoichiometric ratio for conversion of the olefin polymer to mercaptan. Advantageously the hydrogen sulfide is present in excess, and a ratio of from 2:1 to 6:1 is preferred. A substantial excess of hydrogen sulfide may be used if desired, ranging up to 20:1 or more, but this higher ratio has been found not only unnecessary, but also somewhat conducive to lower conversions and yields.

The temperature at which the process is conducted may be as low as 15° C. It has been found that the present method for the preparation of high molecular weight mercaptans can be successfully carried out at ambient temperatures, in the range of 15° to 35° C., without the necessity of supplying an external heat source to the reaction zone. As noted above, the pressures used in the present process are substantially lower than those which have been found economically operative hitherto, so that this embodiment of the invention represents operation under conditions which are substantially milder than those known to be effective in high molecular weight mercaptan synthesis heretofore. The efficiency of the method under these conditions is surprising: it produces practically complete conversion in a single pass.

For effective operation of the present process at these temperatures in the range of ordinary room temperature, it has been found to be essential that the reactants be pre-dried. If moisture is allowed access to the reaction zone, the catalyst is deactivated, and the conversions produced diminish. Pre-drying of the reactants may be accomplished by any of several means, such as contact with a desiccant, heating to drive off water, and so forth. Thus for example, the hydrogen sulfide may be dried by passage through alumina, which can be reactivated for drying purposes by heating at 200° C. The propylene polymer may be dried by distilling off a small fore-run, thereby steam-distilling out the water; or by treating the polymer with calcium chloride or a similar desiccating substance. When the reactants are pre-dried, so that the mixture of propylene polymer and hydrogen sulfide is in a substantially dry state when entering the reaction zone and hydration of the promoted silica catalyst is avoided, the present process can be conducted to give excellent conversions over extended periods of time.

Another embodiment of this invention comprises operating the present process, under the pressure conditions set forth herein, at a temperature substantially above room temperature but below about 100° C. It has been found that the present process is most favorably conducted at a temperature of about 85° C. Selection of temperatures in about this range for operation has the advantage that it is then unnecessary to subject the reactants to a pre-drying treatment. Moisture-containing propylene polymer and hydrogen sulfide may be successfully used to conduct the process over extended periods of time to produce a high and level rate of conversion to mercaptan. This is a surprising feature of this invention, inasmuch as it is reported that in processes for high molecular weight mercaptan synthesis known hitherto, operated at substantially elevated pressures, and temperatures, permitting the introduction of moisture to the reaction zone has a deleterious effect on the activity of the catalyst. In the present process employing relatively mild conditions, it unexpectedly appears that the moisture-sensitivity evident at room temperatures under the pressures utilized herein is no longer a significant factor when the stated temperature of about 85° C. is attained.

The present process is also operable at higher temperatures, ranging from about 100° to about 250° C. However, although the propylene homopolymers are not subject to depolymerization up to above about 150° C., and the yield of desired mercaptan remains quantitative, it has been discovered that the conversions obtainable in the present process decrease at temperatures above about 100° C. Accordingly, the preferred embodiments of this invention comprise operation at the relatively mild temperatures set forth in the preceding paragraphs.

The process of this invention is conducted at a pressure below about 350 p.s.i.g. The pressure employed will generally be at least about 50 p.s.i.g., and is advantageously maintained at least about 100 p.s.i.g. The preferred range of operation herein is from 100 to 200 p.s.i.g. In general, the conversion increases only negligibly in raising the pressure above about 200 p.s.i.g. As pointed out above, ordinary factory equipment is usually limited to about 350 p.s.i.g. or below, so the high conversions obtained with the present process in the range well below about 350 p.s.i.g. are of considerable significance in respect to the commercial application thereof.

The catalyst employed in the process of this invention is a promoted silica catalyst. The catalyst is preferably employed in the form of a synthetic precipitated silica gel promoted by minor proportions of aluminum oxide. For the present purposes, the silica may be promoted or activated by the presence of up to 50%, preferably from about 1% to about 20%, of aluminum oxide. Such silica catalysts are well known in the petroleum art as cracking and polymerization catalysts. Suitable silica/alumina catalysts are prepared as described, for example, in U.S. 2,142,324 and 2,147,985. It has now been found that catalysts of this nature are also effective as catalysts for mercaptan synthesis as described herein. In general, the present catalyst will be employed in the form of shaped particles of suitable size, which may, for example, be exposed to the reactants in a catalyst case or bed in a reactor, or supported in suspension in the reacting stream. Particles ranging from fine powders to relatively coarse granules or pellets may be employed, depending on the intended mode of utilization.

The present reaction will ordinarily be conducted in continuous fashion, the reactants being passed through a catalyst case in a reactor or passed through the reactor in such manner that the catalyst is suspended in the reactant stream. In such operation, catalyst may be withdrawn from the reaction zone continuously or intermittently and replaced or regenerated.

The rate of passage of the reactants through the catalyst bed will vary, depending on the activity of the catalyst and on the conversion which is to be produced. In the instant application the rate of feed of the reactants through the catalyst is described by the term: "mole velocity," defined as gram-moles of feed per kilogram of catalyst per day. In the present process, the rate of feed of the olefin polymer is the essentially controlling factor determinative of the conversions obtained per pass. The olefin polymer rate is accordingly measured and cited herein as the mole velocity of the feed; it is to be understood that the hydrogen sulfide feed will increase the overall reactant feed rate by a factor of 2 or more, depending on the ratio of hydrogen sulfide selected. In the present reaction, propylene polymer mole velocities ranging from 1 mole/kg. catalyst/day to as high as about 200 or 300 may be employed. However, generally for high conversions per pass, lower values will be preferred, and it may be desirable to maintain the olefin polymer mole velocity at below about 100 moles per kilogram of catalyst per day.

The effluent from the catalyst case is subjected to operations as described hereinabove, including recovery of unreacted hydrogen sulfide followed by a stripping operation for the removal of unreacted olefin polymer. The hydrogen sulfide feed is taken off overhead, compressed, and returned to the catalyst feed system where it is blended with the olefin polymer. The olefin removed from the vacuum-stripped, hydrogen-sulfide-free effluent may also be recycled directly to the process. This is a particular advantage of the present high molecular weight mercaptan synthesis method, in that the unreacted olefin polymer may be sent directly to recycle without any necessity for first stripping off light and intermediate hydrocarbons and mercaptans. Because of the absence of depolymerization, the process of this invention results in substantially quantitative yields of high molecular weight mercaptan, obviating both losses of polymer to formation of undesired products and also the necessity for additional operations to remove such undesired products.

As noted hereinabove, it is entirely a matter of choice whether the present reaction is conducted so as to obtain the full benefits of the presently afforded possibility of producing substantially complete conversion in one pass; or whether it is operated under such conditions that the conversion per pass is incomplete, and unreacted olefin polymer is recycled to the process. Since the process avoids decomposition of the olefin polymer, it is entirely flexible in this respect. In general, this choice between one-pass and multi-pass conversion will depend chiefly on apparatus limitations and on the desired daily production rate, for the yield of high molecular weight mercaptan with respect to olefin polymer converted is, in this process, quantitative. Thus it will be evident that whether the present process is operated to produce substantially complete conversion in one pass or whether it is operated on a multi-pass basis, there are decided economic advantages to operating as described herein.

The invention is further illustrated but not limited by the following examples:

*Example 1*

Using apparatus as schematically indicated in the accompanying drawing, hydrogen sulfide was mixed with tetrapropylene in a molar ratio of 4:1 and the mixture, under a pressure of 135 p.s.i.g. and at a temperature of 85° C., was passed to a bed of ⅛" pellets of 13% alumina on silica (Davison Chemical Co.). The one-pass conversion at a mole velocity of 29 was 82–86%.

*Example 2*

Operating as described in Example 1 but employing a tripropylene polymer at a mole velocity of 29 and a temperature of 85° C., the one-pass conversion to high molecular weight mercaptan of average $C_9$ chain length was 88%. The conversion remained constant under these conditions when operation of the process under these conditions was continued for an extended period of time.

*Example 3*

Proceeding as described in Example 2, using similar tripropylene and hydrogen sulfide sources, but at 25° C., the initial conversion was found to be about 88% per pass. As operation of the process was continued however, the conversion fell off rapidly. When fully hydrated the catalyst produced a per pass conversion of only 3%.

*Example 4*

The procedure of Example 3, employing a mixture of tripropylene with hydrogen sulfide at 25° C., was repeated, with the difference that each of the reactants was pre-dried before they were mixed and allowed to contact the catalyst. The conversion was 88% initially, and remained constant at this level to the end of the test.

*Example 5*

A feed of tripropylene and $H_2S$ in a 4:1 molar ratio, was passed at a tripropylene mole velocity of 29 and under a pressure of 135 p.s.i.g. through a reaction zone containing the catalyst described in Example 1, while the temperature of the reactants was varied. At 25° C. and at 85° C., the conversion remained constant at 88%. A further increase in temperature, however, to 115° C., decreased the conversion to about 80%. On returning the temperature of the reactants just prior to entry into the reaction zone to 85° C., the conversion was restored to the value of 88%.

While the invention has been described with reference to various particular preferred embodiments thereof, it is to be understood that it is not limited to the foregoing illustrative examples, and other modifications and variations may be made within the spirit and scope thereof.

What is claimed is:

1. A process for the production of high molecular weight aliphatic mercaptans of from 8 to 18 carbon atoms in high yields and conversions under mild conditions of temperature and pressure which comprises passing a mixture of hydrogen sulfide and propylene homopolymer through a reaction zone containing an alumina promoted silica catalyst at a pressure of from about 50 to about 350 lbs./in.$^2$ gage and at a temperature of from about 25° C. to about 100° C.

2. A method for the production of high molecular weight aliphatic mercaptans having from 8 to 18 carbon atoms in high yields and conversions under mild conditions of temperature and pressure which comprises passing a mixture of propylene homopolymer and hydrogen sulfide through a reaction zone containing a silica catalyst promoted by from 1% to about 20% by weight of alumina at a temperature of from about 25° C. to about 100° C. and under a pressure of from about 100 lbs. to about 200 lbs./in.$^2$ gage.

3. A process for the production of aliphatic mercaptans having an average of about 9 carbon atoms in high conversions under mild conditions of temperature and pressure which comprises passing a mixture of hydrogen sulfide and tripropylene homopolymer through a reaction zone containing a silica catalyst promoted by from 1% to about 20% by weight of alumina at a temperature of from about 25° C. to about 100° C. and at a pressure of from about 50 to about 350 lbs./in.$^2$ gage.

4. A process for the production of aliphatic mercaptans having an average of about 12 carbon atoms in high conversions under mild conditions of temperature and pressure which comprises passing a mixture of hydrogen sulfide and tetrapropylene through a reaction zone containing a silica catalyst promoted by from 1% to about 20% by weight of alumina at a temperature of from about 25° to about 100° C. and under a pressure of from about 50 to about 350 lbs./in.$^2$ gage.

5. A method in accordance with claim 1 in which said mixture of hydrogen sulfide and propylene homopolymer is in a substantially dry state and at a temperature of from about 25° C. to about 35° C. when passed through said reaction zone.

References Cited in the file of this patent

UNITED STATES PATENTS

| | | |
|---|---|---|
| 2,052,268 | Williams et al. | Aug. 25, 1936 |
| 2,392,554 | Schulze | Jan. 8, 1946 |
| 2,426,646 | Schulze | Sept. 2, 1947 |